United States Patent [19]

McCully et al.

[11] Patent Number: 4,813,109

[45] Date of Patent: Mar. 21, 1989

[54] CLIP FOR FASTENING THE ENDS OF AN ELONGATE FLEXIBLE BAND

[75] Inventors: Peter K. McCully, Auckland, New Zealand; Edward C. French, Fullerton, Calif.

[73] Assignee: Illinois Tool Works Inc., Chicago, Ill.

[21] Appl. No.: 87,418

[22] Filed: Aug. 20, 1987

[30] Foreign Application Priority Data

Aug. 20, 1986 [NZ] New Zealand .................. 217275

[51] Int. Cl.[4] .................. B65D 63/00; F16B 35/02
[52] U.S. Cl. .................. 24/278; 24/276; 411/385; 411/435
[58] Field of Search .................. 24/278, 275, 276, 277, 24/16 PB; 248/74.3, 231; 411/385, 383, 435, 437

[56] References Cited

U.S. PATENT DOCUMENTS

| | | | |
|---|---|---|---|
| 1,823,677 | 9/1931 | Bay | 411/385 |
| 2,324,780 | 7/1943 | King | 24/276 |
| 2,374,690 | 5/1945 | Laue | 411/437 |
| 2,576,643 | 11/1951 | Roerig | 411/435 |
| 2,621,383 | 12/1952 | Tresidder et al. | 24/278 |
| 3,456,547 | 7/1969 | Strong | 411/385 |
| 3,552,257 | 1/1971 | Tanabe | 411/435 |
| 4,290,171 | 9/1981 | Wilcox | 24/278 |
| 4,299,520 | 11/1981 | Iwata | 411/437 |
| 4,439,902 | 4/1984 | Huxtable | 24/278 |

FOREIGN PATENT DOCUMENTS

| | | | |
|---|---|---|---|
| 1267330 | 6/1961 | France | 24/278 |
| 868590 | 5/1961 | United Kingdom | 24/278 |

*Primary Examiner*—Victor N. Sakran
*Attorney, Agent, or Firm*—John P. O'Brien; Thomas A. Buckman

[57] ABSTRACT

A clip comprising a body portion and securing means; said body portion being provided with at least one protrusion extending outwardly therefrom, and including at least one slot in at least one side thereof, at or adjacent said at least one protrusion, said at least one slot opening into a bore extending through said body portion; and said securing means including at least one cavity formed in at least one protrusion; the arrangement being such that in use at least two portions of an elongate strip of material are located within said bore, thereby forming a loop in which an article to be secured is located, in use, said body portion being located relative to a support means, and said body portion and said securing means thereafter being engaged one with the other, such that said article is located and retained relative to said clip and support means.

5 Claims, 2 Drawing Sheets

CLIP FOR FASTENING THE ENDS OF AN ELONGATE FLEXIBLE BAND

BACKGROUND OF THE INVENTION

This invention relates to a clip and more particularly to a trellis clip suitable for use in supporting plants and the like.

Up until this time, there have been various methods available for supporting plants, such as, for example, young trees, shrubs and the like in orchards, gardens and commercial horticultural situations, in order to assist the same correct growth and to protect from damage in adverse weather conditions and the like. For example, trees may often be severely damaged during windy conditions, particularly if they are not yet strong enough to support themselves. They are often blown over or their trunks snapped or branches broken off. Previous methods have included tying a piece of string or rope around the trunk of a tree, and securing it to a fence, wire or similar support. Other methods have involved the use of arrangements which include a strap with a head at one end thereof, to which the wire or other support means is attached. Such an arrangement may be further provided with a nut which is engageable to the head of the arrangement, in order to further secure the young tree relative to the head and wire. The abovementioned methods suffer from various disadvantages. For example, some strings or ropes perish, others are difficult to remove, and often the knot in the string or rope may loosen and come undone, with result that the young tree is no longer supported. Similarly, with the strap, head and nut arrangement, the nut often works itself loose, thereby increasing the risk of the arrangement failing totally. In addition, these arrangements often allow for sideways movement of the young tree relative to the wire, which can in itself cause damage to the tree.

It is an object, therefore of one aspect of the present invention to provide a method of supporting young trees and the like, which goes some way towards overcoming or at least minimizing the abovementioned problems.

SUMMARY OF THE INVENTION

Further aspects of the present invention will become apparent from the following description.

According to one aspect of the present invention, there is provided a clip comprising a body portion and a securing means; said body portion being provided with at least one protrusion extending outwardly therefrom, and including at least one slot in at least one side thereof, at or adjacent said at least one protrusion, said slot opening into a bore extending through said body portion; and said securing means including at least one cavity formed in at least one face thereof, said cavity being adapted in use to locate and house said at least one protrusion; said body portion and said securing means being engageable one with the other, so as to secure at least one elongate strip of material at least partially within and about said bore.

According to a further aspect of the present invention, there is provided a clip comprising a body portion and securing means; said body portion being provided with at least one protrusion extending outwardly therefrom, and including at least one slot in at least one side thereof, at or adjacent said at least one protrusion, said at least one slot opening into a bore extending through said body portion; and said securing means including at least one cavity formed in at least one face thereof, said cavity being adapted in use to locate and house said at least one protrusion; the arrangement being such that in use at least two portions of an elongate strip of material are located within said bore, thereby forming a loop in which an article to be secured is located, in use, said body portion being located relative to a support means, and said body portion and said securing means thereafter being engaged one with the other, such that said article is located and retained relative to said clip and said support means.

According to a still further aspect of the present invention there is provided a clip comprising a body portion, a securing means and an elongate strip of material; said body portion being provided with at least one protrusion extending outwardly therefrom, and including at least one slot in at least one side thereof, at or adjacent said at least one protrusion, said at least one slot opening into a bore extending through said body portion; and said securing means including at least one cavity formed in at least one face thereof, said cavity being adapted in use to locate and house said at least one protrusion; said elongate strip of material including at least one free end, and at least one end attached or engaged in or adjacent said bore of said body portion; the arrangement being such that in use at least a portion of said elongate strip of material is located about or adjacent an article to be secured, with said free end of said elongate strip of material being located at least partially within or adjacent said bore of said body portion, so as to locate and retain said body portion relative to said article; at least a portion of a support means being located at least partially in or through said slot, said securing means thereafter being releasably engaged with said body portion by location and engagement of said at least one protrusion within said bore, thereby securing said article relative to said support means.

According to a still further aspect of the present invention there is provided a method of securing an article to a support means, including the steps of locating a clip relative to said support means; said clip comprising a body portion and securing means, said body portion being provided with at least one protrusion extending outwardly therefrom, and including at least one slot in at least one side thereof, at or adjacent said at least one protrusion, said slot opening into a bore extending through said locating portion, and said securing means including at least one cavity formed in at least one face thereof, said cavity being adapted in use to locate and house said at least one protrusion; thereafter locating at least two portions of an elongate strip of material through or adjacent said bore, at least a portion of said elongate strip of material extending at least partially around or adjacent at least a portion of said article, so as to locate and retain said body portion relative to said article; thereafter locating at least a portion of said support means relative to said body portion; and thereafter releasably engaging said securing means with said body portion, so as to secure and locate said article relative to said clip and relative to said support means.

BRIEF DESCRIPTION OF THE DRAWINGS

Further aspects of the present invention will become apparent from the following description which is given by way of example only, and with reference to the accompanying drawings, in which.

DETAILED DESCRIPTION OF THE PREFERRED EMBODIMENT

Figure 1:
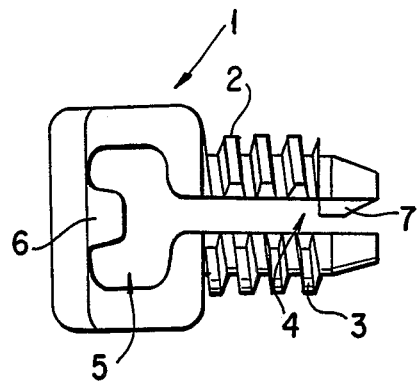
FIG. 1; Shows a side view of a body portion of a clip according to one aspect of the present invention, FIG. 2; Shows a plan view of the body portion shown in FIG. 1, FIG. 3; Shows a cross-sectional view of a securing portion according to one aspect of the present invention, FIG. 4; Shows a plan view of the securing portion shown in FIG. 3, FIG. 5; Shows a perspective exploded view of a clip according to one aspect of the present invention, FIG. 6; Shows a perspective exploded view of a clip according to one aspect of the present invention, in use, FIG. 7; Shows a cross-sectional view of a portion of a clip according to one aspect of the present invention, in use.

Referring now to the accompanying drawings, there is provided in one form of the invention a body portion 1. The body portion 1 includes protrusions 2 and 3 extending outwardly from one side thereof. Extending between said protrusion 2 and 3 is a slot 4. In one preferred form of the invention, the slot 4 opens into a bore or cavity 5, the bore or cavity 5 extending through the body portion 1.

Figure 2:
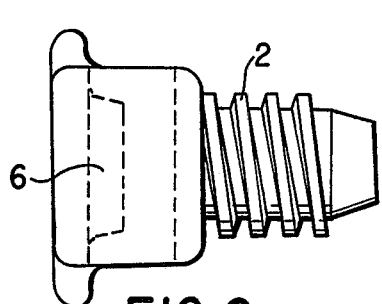

In one preferred form of the invention, the bore 5 is provided with a rib or ridge 6 extending at least partially along the length thereof, as shown in FIG. 2.

In one preferred form of the invention, at least one of the protrusions 2 or 3 is provided with a notch 7, the notch 7 extending at least partially into the slot 4.

Figure 5:
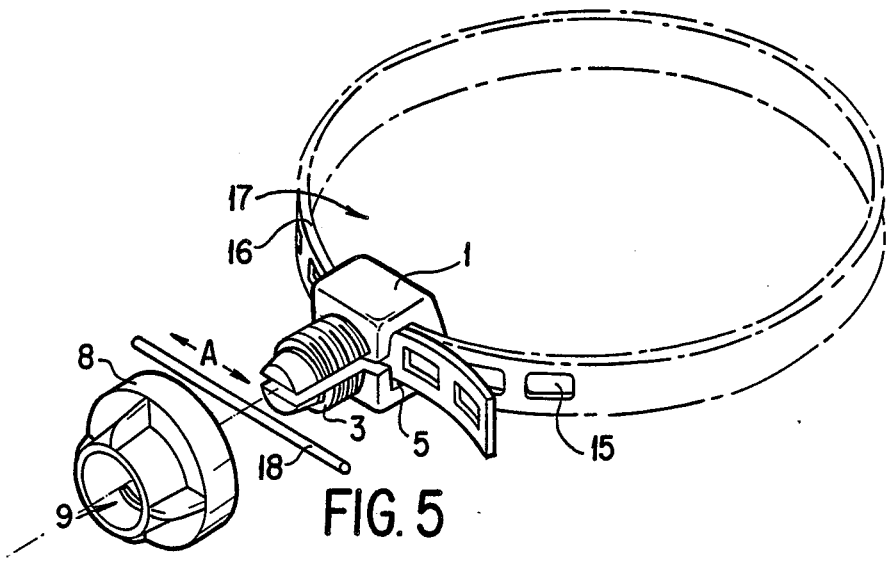

As will be apparent from FIG. 5, the protrusions 2 and 3 are substantially curved, so as to be substantially semi-circular in shape, in one preferred form of the invention. Thus, in one preferred form of the invention the protrusions 2 and 3 form a substantially circular protrusion, with the slot 4 extending substantially through the center thereof.

In one preferred form of the invention, the protrusions 2 and 3 are at least partially threaded, as will be further described hereinafter.

Figure 3:
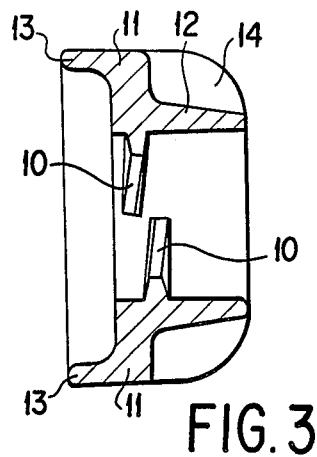
Figure 4:
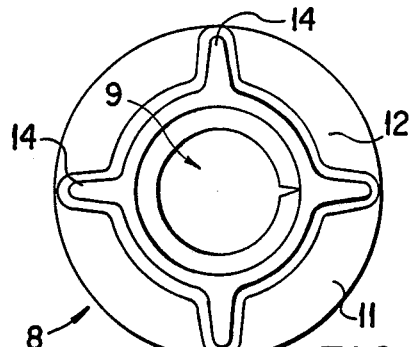

Referring now to FIGS. 3 and 4, a clip according to the present invention also includes a securing portion in the form of a nut 8. Preferably, the nut 8 has a cavity 9 therein.

In one preferred form of the invention, the cavity 9 extends through the nut 8. However, it will be appreciated that the cavity 9 may extend only partially through the nut 8.

The nut 8 also comprises a lower portion 11 and an upper portion 12. Preferably, the upper portion 12 is of lesser diameter than the lower portion 11.

The lower portion 11 further comprises an extension 13 extending around the periphery thereof.

In a further preferred form of the invention, the upper portion 12 is provided with a series of spaced apart radial ribs 14, which assist in the tightening of the nut 8 relative to the body portion 1, as will be further described hereinafter.

A clip according to the present invention is preferably used in conjunction with an elongate strip of material. Although any suitable or appropriate elongate strip of material may be used to advantage, an elongate strip of material according to one preferred form of the invention comprises a substantially flexible strip with at least one opening extending therethrough.

For example, the elongate strip of material 16 as shown in FIG. 5 comprises a series of openings 15 therein. This allows for straight forward and convenient adjustment of the length of the strip of material relative to the clip, during use, as will be further described hereinafter.

In use, a clip according to the present invention may be used to facilitate the supporting and securing of an article, such as for example a plant, tree or the like, relative to a suitable support.

For example, referring now to FIG. 5, at least a portion of one end of the elongate strip of material 16 is located within the bore 5 of the body portion 1.

Figures 6, 7:
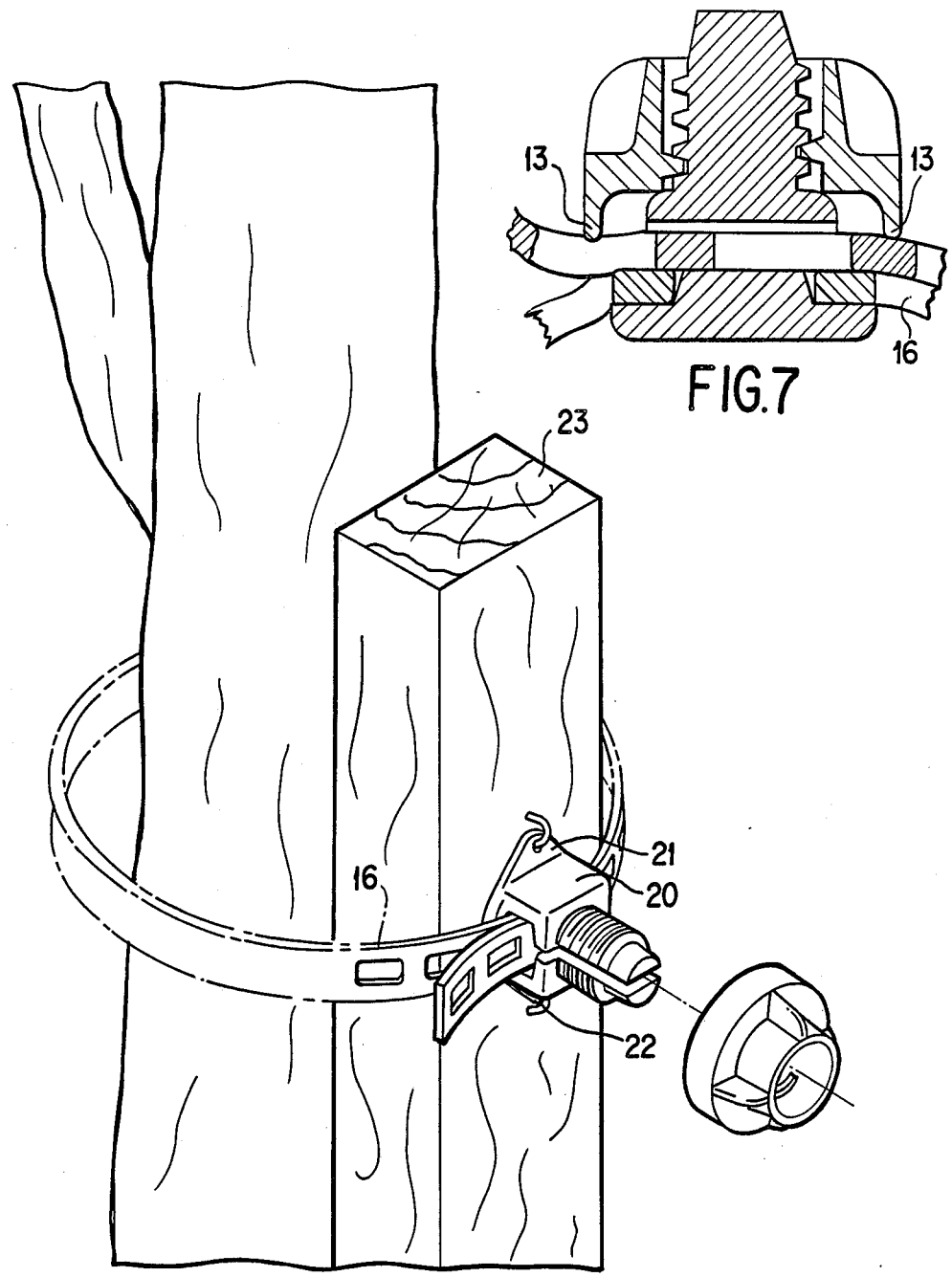

The elongate strip of material 16 may be releasably engaged or secured relative to the body portion 1, by engagement of at least one opening 15 of the elongate strip of material 16 about or adjacent the rib or ridge 6, as shown in FIG. 7. Thus, at least one portion of the elongate strip of material 16 is secured relative to the body portion 1.

At least a portion of the elongate strip of material 16 is then located about or around an article to be secured and supported. For example, the elongate strip of material 16 may be located around or about a trunk of a young tree, so that the trunk is located within the space 17.

A further portion of the elongate strip of material 16 is then located within the bore or cavity 5 of the body portion 1. For example, a substantially free end of the elongate strip of material 16 is located within the bore 5 of the body portion 1.

In the preferred form of the invention shown in FIGS. 1 to 5 of the accompanying drawings, an article (such as for example a tree) to be secured and supported is secured relative to a wire, for example a wire of a fence or the like.

Referring now to FIG. 5 of the accompanying drawings, the wire 18 is located at least partially within the bore 5 of the body portion 1, by movement of the wire 15 through the slot 4. The wire 18 may need to be forced past the notch 7, which then acts as a retaining means. Considerable force is then required in order to remove the wire 18 from the slot 4.

Thus, the wire 18 is moved through the slot 4, and at least a portion thereof is located within the bore 5, so as to be juxtaposed at least a portion of the elongate strip of material 16.

Once the elongate strip of material 16 and the wire 18 are in position, with the elongate strip of material 16 being located substantially about and around the article to be supported and secured, the locking nut 8 is releasably engaged with the body portion 1. As the protrusions 2 and 3 and the cavity 9 are at least partially threaded, in one preferred form of the invention, the locking nut 8 is releasably engaged with a body portion 1 by securing the locking nut 8 onto and about the protrusions 2 and 3.

The locking nut 8 is secured firmly against the body portion 1. The locking nut 8 may be tightened by turning the same in the appropriate direction, an engagement of the nut 8 and body portion 1 being facilitated by applying pressure against the ribs 14, by hand or by use of a suitable tool.

There are several advantages in screwing the locking nut 8 firmly against the body portion 1. As the nut 8 is tightened against the body portion 1, the wire 18 is forced against the elongate strip of material 16 located within the bore 5, this action assisting the securing of the elongate strip of material 16 and in particular the end thereof which is juxtaposed the wire 18, and which is not secured by engagement with the rib or ridge 6. In addition, the tightening of the nut 8 assists in preventing the nut 8 from self-loosening with time.

Furthermore, as the nut 8 is secured against the body portion 1, the extension 13 extending around the periphery of the nut 8 comes into contact with the wire 18 and the elongate strip of material 16. By forcing the extension 13 against the wire 18, the same are further secured relative to the clip.

In order to release engagement of the nut 8 and the body portion 1, the nut 8 is turned in the opposite direction, thereby loosening the nut and removing the nut from the body portion 1.

Thereafter, the clip may be removed, or adjusted relative to the elongate strip of material 16, and article to be secured and the like.

Another preferred form of the invention is shown in FIGS. 6 and 7. In this preferred form of the invention, the body portion 20 is substantially similar to the body portion 1, as shown in FIGS. 1 to 5 of the accompanying drawings.

However, the body portion 20 is further provided with two extensions 21 and 22, extending outwardly from opposite sides thereof. The extensions 21 and 22 are provided with openings therein, which allow for the clip according to the present invention to be attached or fastened to a suitable support, such as, for example, a post 23. Thus, the clip provided in this preferred form of the invention is substantially similar in use to that shown in FIGS. 1 to 5, except that the wire 18 is not required. Instead, the body portion 20 is attached by means of the extensions 21 and 22 to the support means, by means of stapling, nailing and the like. The two portions of the elongate strip of material 16 only pass through the bore or cavity 5.

As shown in FIG. 7, the two portions of the elongate strip of material 16 are clamped within the bore 5 by the extension 13.

A further advantage to be gained by securing the nut 8 firmly against the wire 18 is that movement in the direction indicated by the arrow A in FIG. 5 is prevented, or at least minimized. In effect, movement of the clip is prevented or minimized and therefore the plant or other article which is being supported and secured by the clip is prevented from movement relative to the wire. This is a particular advantage in conditions where the plant or other article is likely to move or be moved no matter which may otherwise cause damage to it.

Although this invention has been described by way of example, and with particular reference to the accompanying drawings, it is envisaged that modifications may be made thereto, without departing from the scope thereof. For example, it is envisaged that the elongate strip of material 16 may take other forms. There may be provided only one or two openings 15, or a plurality of openings 15, for example, extending entirely along the length of the elongate strip of material 16.

Alternatively, the elongate strip of material 16 may be provided with no openings 15 therein, the ends thereof being secured within the wall 5 of the body portion 1 by other means. For example, at least one end thereof may be integrally formed with the body portion 1.

In addition, means of engaging the nut 8 with the protrusions 2 and 3 may take other forms. For example, the protrusions 2 and 3 may be provided with a single ridge extending around the circumference thereof, the locking nut 8 being provided with a corresponding indent or recess therein, extending around an inner surface of the cavity 9. Thus, the nut 8 and body 1 would be releasably engaged one with the other by location of the ridge within the recess.

It is also envisaged that there may be provided with the number of protrusions extending outwardly from the body portion 1. For example, there may be provided four protrusions, with two slots extending therebetween, for example, the slots being located substantially perpendicularly one with the other.

It is also envisaged that the body portion 1 may be attached to a suitable support means by other methods. For example, the body portion 1 may be bolted to a suitable support means.

It is envisaged that a clip according to the present invention may be formed of any suitable material and from any suitable technique. For example, the clip may be formed of a suitable plastics material and preferably the elongate strip of materials is formed of a flexible material, for example, a plastic material. It is envisaged, however, that other materials may also be used to advantage. The clip according to the present invention may be formed by any suitable technique, according to the material used.

For example, molding or extrusion of a plastic material may be used to advantage.

Preferably, the body portion 1 according to the present invention is formed as an integral unit, and the securing nut 8 is also formed as an integral unit. It is also envisaged that the elongate strip of material is formed as an integral unit, however, in one preferred form of the invention the body portion 1 and elongate strip of material may be formed as an integral unit, such that one end of the elongate strip of material extends outwardly from the body portion 1.

Thus, by this invention there is provided a clip suitable for use in supporting and securing plants and the like relative to a supporting means, such as for example, a wire, post and the like. The clip is simple and inexpensive to manufacture and is straight forward and useful in operation and use.

Although this invention has been described by way of example, and with particular reference to various embodiments thereof, it should be understood that modifications and variations may be made thereto, without departing from the scope thereof, as defined in the appended claims.

What is claimed is:

1. A clip comprising a body portion, a securing means and an elongated strip of material; said body portion comprising a base member and at least one threaded protrusion extending from said base member, a bore formed through said base member with a height greater than two times the thickness of said elongate strip and in a crosswise direction to said threaded protrusion, a rib projecting partially across said bore in the same direction as said threaded protrusion, said elongate strip having a plurality of openings along its length and of a size to fit over said rib whenever a length of said elongate strip is threaded through said bore, and said securing means comprising a nut with threads of a size to fit into threaded engagement with said at least one threaded protrusion, said nut having a peripheral extension projecting beyond its threads, whereby one end of said elongate strip is adapted to be hooked over said rib and the other end is adapted to be brought through said bore to provide a closed loop arrangement and thereafter said nut is adapted to screwed along the threads of said at least one protrusion until said peripheral extension is brought into tight engagement with said other end of said elongate strip.

2. A clip as defined in claim 1, wherein said at least one threaded protrusion comprises two threaded protrusions disposed in a generally parallel spaced apart relation to define a slot therebetween, said slot continuing through said base member in direct communication with said bore and being in direct alignment with said rib.

3. A clip as defined in claim 2, wherein one of said threaded protrusions includes a notch extending into said slot.

4. A clip comprising a body portion, a securing means and a elongate strip of flexible material; said body portion comprising a base member and a pair of spaced apart semi-circular protrusions with exterior threads extending from said base member, a bore formed through said base member with a height greater than two times the thickness of said elongate strip and in a crosswise direction to said threaded protrusions, a slot formed through said base member and in direct alignment with the space between said protrusions, a rib projecting partially across said bore in direct alignment with said slot, said elongate strip having a plurality of openings along its length and of a size to fit over said rib whenever a length of said elongate strip is threaded through said bore, and said securing means comprising a nut with threads of a size to fit into threaded engagement with said threaded protrusions, said nut having a peripheral extension projecting beyond its threads, whereby one end of said elongate strip is adapted to be hooked over said rib and the other end is adapted to brought through said bore to provide a closed loop arrangement and thereafter said nut is adapted to be screwed along said protrusions until said peripheral extension is brought into tight engagement with said other end of said elongate strip.

5. A clip as defined in claim 4, wherein one of said threaded protrusions includes a notch extending into said slot.

* * * * *